United States Patent
Shin

(10) Patent No.: US 8,219,101 B2
(45) Date of Patent: Jul. 10, 2012

(54) CELL MANAGEMENT METHOD AND MOBILE TELECOMMUNICATION SYSTEM FOR THE SAME

(75) Inventor: Hong Sup Shin, Seoul (KR)

(73) Assignee: LG-Ericsson Co., Ltd., Seoul (KR)

( * ) Notice: Subject to any disclaimer, the term of this patent is extended or adjusted under 35 U.S.C. 154(b) by 268 days.

(21) Appl. No.: 12/646,466

(22) Filed: Dec. 23, 2009

(65) Prior Publication Data

US 2010/0167730 A1     Jul. 1, 2010

(30) Foreign Application Priority Data

Dec. 30, 2008   (KR) .................. 10-2008-0136805

(51) Int. Cl.
*H04W 36/00*   (2009.01)

(52) U.S. Cl. ..... 455/444; 455/434; 455/522; 455/422.1; 455/436

(58) Field of Classification Search .................. 455/444, 455/434, 522, 422.1, 436
See application file for complete search history.

(56) References Cited

U.S. PATENT DOCUMENTS

| | | | |
|---|---|---|---|
| 2009/0238114 A1* | 9/2009 | Deshpande et al. | 370/328 |
| 2009/0239533 A1* | 9/2009 | Somasundaram et al. | 455/434 |
| 2010/0035647 A1* | 2/2010 | Gholmieh et al. | 455/522 |

* cited by examiner

*Primary Examiner* — Barry Taylor
(74) *Attorney, Agent, or Firm* — KED & Associates, LLP

(57) ABSTRACT

A method of managing cells of base stations (BSs) and a mobile telecommunication system for the same, capable of allowing a user equipment (UE), which had not been permitted, to access the CSG BS if the UE meets an access condition, are disclosed. In accordance with the method and the system, an outdoor BS, manages a list of indoor BSs of a CCSG selected among indoor BSs of the CSG. The indoor BSs of the CCSG allow the UE to access the indoor BSs of the CCSG when the UE meets an access condition. The outdoor BS broadcasts a reporting criteria and reporting information, receives measurement values that meet the reporting criteria and an identity of the indoor BS as the reporting information from the UE, recognizes the environment of the UE based on the measurement value, checks the identity of the indoor base station in the list of the CCSG and allows the UE to access the indoor base station based on a check result.

18 Claims, 3 Drawing Sheets

CELL MANAGEMENT METHOD AND MOBILE TELECOMMUNICATION SYSTEM FOR THE SAME

CROSS-REFERENCE TO RELATED APPLICATIONS

The present application claims priority from Korean Patent Application No. 10-2008-0136805 filed on Dec. 30, 2008, the entire subject matter of which is incorporated herein by reference.

TECHNICAL FIELD

The present invention may generally relate to a mobile telecommunication system. More particularly, the present invention may relate to a cell management method which may allow a user equipment to access to a femtocell operated in a mode of a closed subscriber group (CSG) if the user equipment meets certain conditions for access.

BACKGROUND

Recently, various services based on wireless communication networks have been provided owing to rapid progress in the areas of communication systems, computer networks and semiconductor devices. Also, users need high-level services as days go by, and there is a trend of explosive growth in wireless internet service markets all over the world. Accordingly, mobile communication systems in wireless communication networks have been developed to provide multi-media services, capable of transmitting various data, as well as voice services.

Now, wireless data services are commercialized based on technologies using code division multiple access (CDMA) 2000, evolution data only (EV-DO), wideband CDMA (WCDMA) and wireless local area network (WLAN). Recently, mobile phones are widely used in every home, and demands for wireless data are increasing constantly. To meet the demands, a method of providing mobile telecommunication with a small base station established indoors is introduced. With the small indoor base station, it is possible to access to a core network of mobile telecommunications networks through an indoor broad band network. The small mobile telecommunication base station is known as an indoor base station or femto-base station.

By introducing the indoor base station to a conventional telecommunication network including an outdoor base station, there have been developments on hybrid telecommunication networks including outdoor and indoor base stations. As a typical example, there is a long term evolution (LTE) network of which standard has been settled with the 3$^{rd}$ Generation Partnership Project (3GPP). Networks in accordance with the LTE standards (hereinafter, "LTE network"), have 100 Mbps and 50 Mbps data transmission rates at a down-link and an up-link, respectively. With respect to a delay, a user's data bandwidth is within 5 ms. Also, the LTE network has a low transmission delay and an improved transmission rate at cell boundaries.

A conventional LTE network includes an outdoor base station (Macro-eNB (enhanced Node B)), an indoor base station (Home-eNB), a mobility management entity (MME) and a self organizing & optimizing network (SON) server. Since the indoor base station and the outdoor base station access the core network independently, a user equipment (UE) can communicate through either the indoor base station or the outdoor base station. The MME is used for managing a handover and processing a call of the user equipment. The SON server performs establishment and optimizations of the outdoor/indoor base stations. Also, the SON server is an arbitrary server which provides basic parameters or required data to the respective base stations. Any functions of the MME and SON server can be performed with one network management device.

In the LTE network having the structure mentioned above, access to the indoor base station cell (femtocell) is granted to limited user equipments (subscribers). To put it concretely, the indoor base station can broadcast System Infoiniation Block type 1 (SIB 1), i.e., information on a femtocell which is managed by the indoor base station itself. The SIB 1 includes a closed subscriber group (CSG) indicator which denotes whether access to the femtocell is allowed or not. If the CSG indicator in the SIB 1 broadcasted by the indoor base station denotes a 'True' value, the communication is performed in a mode of the CSG, i.e., only specific subscribers are permitted to access the femtocell. If the CSG indicator denotes a 'False' value, the communication can be performed in another mode the opened subscriber group (OSG), i.e. all subscribers can access to the femtocell. If the CSG indicator denotes a true value, the user equipment can access the femtocell only when it is confirmed that the corresponding femtocell is included in a white list which shows femtocells accessible to the user equipment.

Like this, according to the CSG mode, only specific user equipment is permitted to access the femtocell and other user equipment is not permitted in any circumstance. Moreover, in the CSG mode, the access to the femtocell is never permitted to other user equipment but the specific user, even though the other user equipment has some imbalance between up-link (UL) path loss and down-link (DL) path loss. In this case, the user equipment can access only to the cell of the outdoor base station (macro-cell) instead of accessing an adjacent femtocell. Thus, lots of power should be consumed for an up-link transmission with the outdoor base station (macro-base station). Further, the up-link transmission between the user equipment and the outdoor base station causes considerable interference to the up-link transmission of the indoor base station.

SUMMARY

The present invention provides a method of managing cells of base stations and a mobile telecommunication system for the same, capable of allowing a user equipment, which had not been permitted, to access to the CSG base station if the user equipment meets an access condition. In accordance with the method and the system, an outdoor base station, manages a list of indoor base stations of a conditional closed subscriber group (CCSG) selected among indoor base stations of a closed subscriber group (CSG). The indoor base stations of the CCSG allow a user equipment to access the indoor base stations when the user equipment meets an access condition. The outdoor base station broadcasts a reporting criteria and reporting information, receives measurement values that meet the reporting criteria and an identity of the indoor base station as the reporting information from the user equipment, recognizes the environment of the user equipment based on the measurement value, checks the identity of the indoor base station in the list of the CCSG and allows the user equipment to access the indoor base station based on a check result.

DETAILED DESCRIPTION

Figure 1:
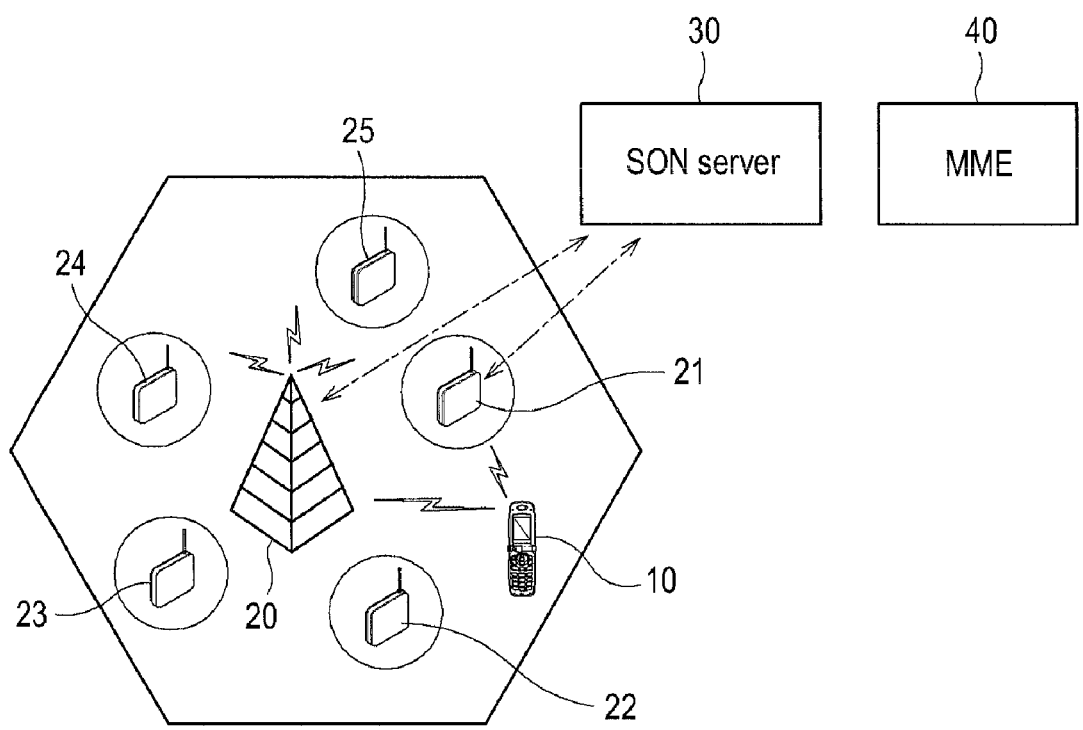
FIG. 1 shows an exemplary mobile telecommunication network adopted in the present invention.

Hereinafter, various embodiments of the present invention are described in detail with reference to the attached drawings. In the drawings, well-known elements, in the relevant art, have been omitted in order not to obscure the present invention in unnecessary detail.

Figure 3:
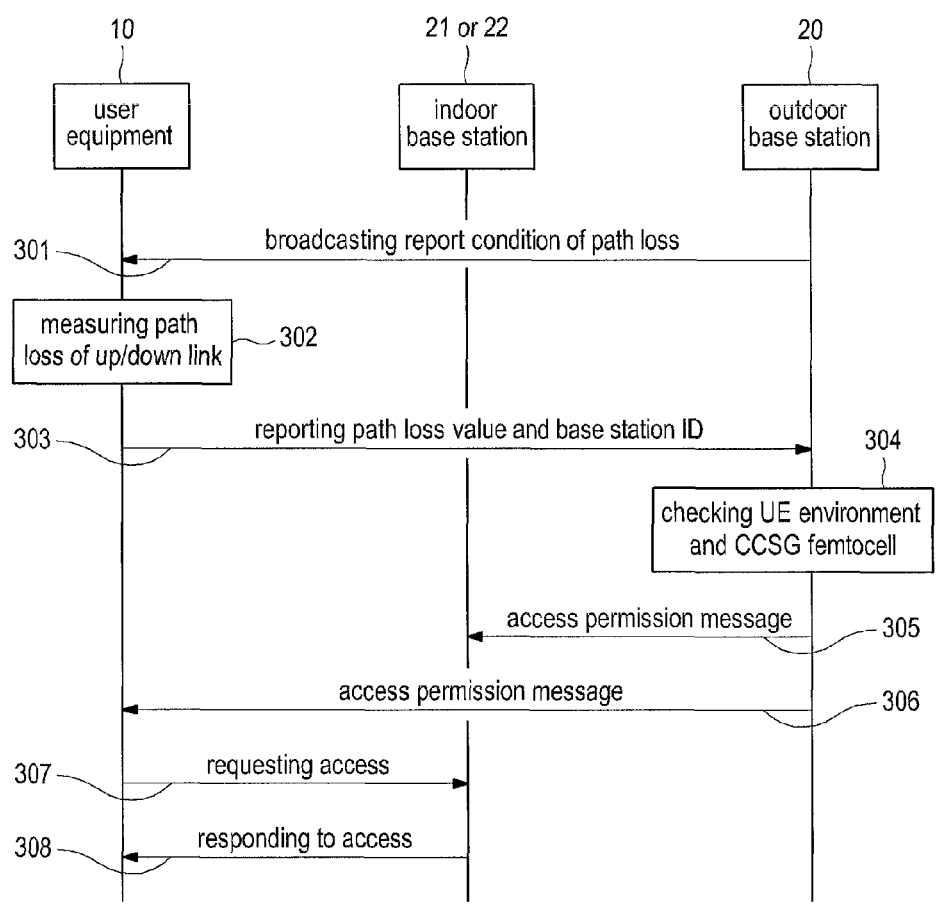
FIG. 3 shows a flow chart of cell management in accordance with an embodiment of the present invention.

FIG. 1 shows an exemplary mobile telecommunication network adopted in the present invention, and FIG. 3 shows a flow chart of cell management in accordance with an embodiment of the present invention.

In one embodiment, the mobile telecommunication network may be any one of: Global System for Mobile communication (GSM); a 2G mobile communication such as the CDMA; wireless networks such as the LTE network and the WiFi; a mobile internetwork such as a Wireless Broadband Internet (WiBro) and a World Interoperability for Microwave Access (WiMAX); and a mobile communication network supporting packet transmission (for instance, 3G mobile communication network such as WCDMA or CDMA 2000, a High Speed Downlink Packet Access (HSDPA) or a High Speed Uplink Packet Access (HSUPA) such as 3.5G mobile communication network, 4 G communication network to be developed and so on), in which an outdoor base station (Macro-eNB), an indoor base station (Home-eNB) and user equipments (UE) are included. However, the communication network is not limited thereto.

As shown in FIG. 1, a mobile telecommunication network may include at least one network cell. Each mobile telecommunication network may include different kinds of network cells. The mobile communication network may include indoor base stations 21 to 25 which manage narrow scope network cells (femtocells) within indoor environments, outdoor base station 20 which manages wide scope cells (macro-cells), user equipment 10, a self organizing & optimizing networks (SON) server 30 and an MME 40. The number of each component shown in FIG. 1 is exemplary, that is, the number of each component of the mobile communication network is not limited as shown in FIG. 1.

Outdoor base station (Macro-eNB) 20 may be any base station capable of being adopted in the LTE network, the WiFi network, the WiBro network, the WCDMA network, the CDMA network, the UMTS network or the GSM network. For instance, the base station may have the characteristics of the macro-base station which manages cells of about 1 Km diameters. However, the outdoor base station is not limited thereto.

Indoor base stations (Home-eNB) 21 to 25 may be any base station capable of being adopted in the LTE network, the WiFi network, the WiBro network, the WCDMA network, the CDMA network, the UMTS network or the GSM network. For instance, the base station may have the characteristics of the femto-base station managing cells having a diameter of about tens of meters. However, the indoor base stations are not limited thereto.

The network cell of the mobile telecommunication network may include cells of the outdoor base stations (macrocells) and the cells of the indoor base station (femtocells). The macro-cells may be managed by outdoor base station 20, and the femtocells may be managed by indoor base stations 21 to 25.

Indoor base stations 21 to 25 or outdoor base stations 20 may have independent accessibility to the core network.

The closed subscriber group (CSG) is a group of indoor base stations 21 to 25 which have specific properties. All indoor base stations 21 to 25 included in the CSG may allow only permitted user equipments to access the indoor base stations 21 to 25. User equipment 10, belonging to a femtocell managed by indoor base stations 21 to 25, may have an identity (ID) for the indoor base stations listed on a "White List". Only the indoor base stations listed on the white list will allow the user equipment to access the listed indoor base stations. Other user equipment will not be given access to the listed indoor base stations. For instance, if it is assumed that indoor base stations 21 to 24 are the CSG base stations and the other indoor base station 25 is the OSG base station of the femtocell, the OSG base station 25 becomes the indoor base station included in the white list. Thus, all of the user equipment can have access to indoor base station 25 while only the permitted user equipment can access indoor base stations 21 to 24.

User equipment 10 may access OSG base station 25 as follows. User equipment 10 may check whether the access is allowed to a certain femtocell based on the CSG indicator of SIB 1 broadcasted by indoor base stations 21 to 25. Also, a physical cell identity (PCI) and a cell global identity (CGI) may be used as the cell identifiers for identifying the cells of the indoor base stations. The PCI is a factor for identifying cells in a physical layer, and the CGI is a cell global identity, which is a standard factor for identifying cells in the mobile communication network. The cell identifiers may be included in the STB 1 broadcasted by indoor base stations 21 to 25. In one embodiment, if user equipment 10 detects OSG base station 25, user equipment reports the detection result to outdoor base station 20. Outdoor base station 20, which received the detection of the indoor base station 25 from user equipment 10, may command user equipment 10 to report the cell identity (PCI or CGI) of indoor base station 25 by reading the SIB 1 received from detected indoor base station 25. Also, outdoor base station 20 may determine whether user equipment 10 is permitted to access detected indoor base station 25 based on the cell identity reported from user equipment 10 and the white list. If it is determined that user equipment 10 can access indoor base station 25, outdoor base station 20 may allow a handover to indoor base station 25.

A conditional closed subscriber group (CCSG) is a group of indoor base stations (for instance, indoor base stations 21 and 22) selected among the indoor base stations 21 to 24 of the CSG base stations, which allows access only to user equipment 10 which meets a specific condition. In other words, the CCSG is the group of indoor base stations 21 and 22, which additionally allow access to the user equipment 10 when the specific condition is met. Thus, in the femtocell, if it is assumed that indoor base stations 21 to 24 are grouped as the CSG base stations, indoor base stations 21 and 22 become the CCSG base stations. Outdoor base station 20 may save and manage information on CCSG base stations 21 and 22 (IDs of the base stations). In one embodiment, the user equipment which meets the specific condition is the user equipment of which the UL path loss and the DL path loss are imbalanced. In the present invention, the base stations of the CCSG are targets, and access is allowed to user equipment 10 which meets the specific condition.

The characteristics of OSG base station 25, CSG base stations 21 to 24, and CCSG base stations 21 and 22 of the lower femtocells are already established in the macro-cell. Outdoor base station 20 may save and mange information on the characteristics of indoor base station 21 to 25 (OSG base station, CSG base station and CCSG base station).

Figure 2:
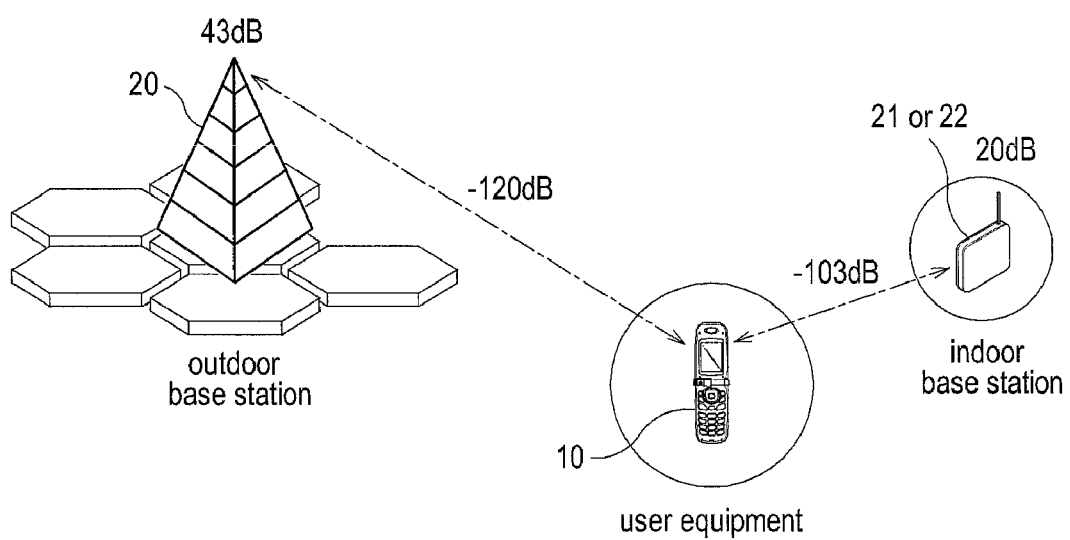
FIG. 2 is an illustrative diagram showing a user equipment of which path losses of UL/DL are imbalanced in accordance with an embodiment of the present invention.

User equipment (UE) 10 may have the characteristics of a wireless mobile terminal which can be used in the GSM network, 2G mobile communication networks such as the CDMA, wireless networks such as the LTE network and WiFi, mobile internetworks such as the Wireless Broadband Internet (WiBro) and the World Interoperability for Microwave Access (WiMAX), and the mobile communication network supporting packet transmission. However, the user equipment (UE) is not limited thereto. In one embodiment, the user equipment 10 may be a subscriber's terminal of macro-cell and/or femtocell. In this embodiment, the user equipment may have imbalanced path losses between the up-link and the down-link. Referring to FIG. 2, user equipment 10 which has imbalanced UL/DL path losses will be explained. Indoor base station 21 of FIG. 2 is the CSG base station as well as the CCSG base station of the present invention.

Generally, the handover between the outdoor base stations are performed when the path losses of the UL/DL are almost the same (balance of UL/DL). The DL power, measured at the two outdoor base stations, located at the same distance from the user equipment, are almost equal, because transmitting output (transmitting power) of the two outdoor base stations are equal. However, if the transmitting outputs of two base stations (for instance, the outdoor base station and the indoor base station) are different, the path losses from the two base stations may differ as much as the difference of the transmitting outputs though the DL power measured at the two base stations is equal. For instance, in FIG. 2, the DL path loss is "−103+20=−80 dB" at indoor base stations 21 or 22 while the DL path loss is "−120+43=−77 dB" at outdoor base station 20. Thus, outdoor base station 20 is more advantageous by 6 dB in the DL path loss. However, in the case of the UL, the path loss of indoor base station 21 or 22 is −103 dB and that of outdoor base station is −120 dB. That is, indoor base station 21 or 22 is more advantageous by 17 dB in the UL path loss. Thus, considering link quality, indoor base station 21 or 22 has more advantage in the UL access, and the outdoor base station 20 has more advantage in the DL access. However, indoor base station 21 or 22 does not permit unspecific user equipment 10 to access the indoor base stations since indoor base stations 21 or 22 are the CSG base station. This happens very often when the transmitting outputs are not equal. This situation is called as "an imbalance state of UL/DL."

Referring again to FIG. 1, SON server 30 may perform establishment and optimizations of the outdoor/indoor base stations. SON server 30 may include an arbitrary server which provides the basic parameters or the data required to the respective base stations.

MME 40 may include an arbitrary object for managing the handover and processing calls of user equipment 10.

In one embodiment, one network management device may perform any functions of SON server 30 and MME 40. SON server 30 and MME 40 may manage at least one of outdoor base station 20 and at least one of indoor base stations 21 to 25. Detailed descriptions on SON server 30 and MME 40 are omitted since those are not directly related to the present invention and are well know to one of ordinary skill in the art.

In one embodiment, outdoor base station 20 and indoor base stations 21 to 25 may save and manage a list of neighboring cells which are physically adjacent thereto. In one embodiment, the list may include a femtocell list on the femtocells managed by outdoor base station 20. In the femtocell list, information on IDs of the OSG base station, the CSG base station and the CCSG base station may be included.

In other words, the femtocell list may include the list of indoor base stations (IDs of the OSG base station) accessible by user equipment 10, i.e., the white less (a list of OSG femtocell). Especially, the femtocell list may include a list of CCSG femtocell (IDs of indoor base stations 21 and 22) relating to CCSG base stations 21 and 22.

Referring to FIG. 3, a process for allowing user equipment 10, which had not been permitted, to access to the CSG base station (strictly speaking, to the CCSG base station) will be explained.

Outdoor base station 20 may save and manage not only the list of the CCSG femtocell (IDs of the CCSG base stations 21 and 22) but also reporting criteria of path loss, information for measurement and another information to be reported by user equipment 10. Outdoor base station 20 may put the reporting criteria of path loss, information for measurement and the another information to be reported by user equipment 10 to SIB information and broadcast the SIB information to all the user equipment 10 in the macro-cell (step 301).

The reporting criteria of user equipment 10 are included in a field, which is allocated for the minimum value of the path loss (pathloss_min) and the maximum value of the path loss (pathloss_max), in SIB information broadcasted by outdoor base station 20. The information for the measurement may include information on transmitting outputs of the base stations, which are required to measure path losses of the UL/DL. Further, the information to be reported by user equipment 10 (reporting information) may include measured values of path losses and the IDs of the corresponding indoor base station (for example, indoor base station 21 or 22).

User equipment 10 may measure the values of the path losses of indoor base station 21 or 22 and outdoor base station 20 at UL and DL (step 302). If each path loss value of UL/DL is between the maximum value (for instance, −90 dB for UL and −70 dB for DL) and the minimum value (for instance, −130 dB for UL and −90 dB for DL), user equipment 10 may transmit the measured path loss of UL/DL and the ID of the corresponding base station 21 or 22 to outdoor base station 20 (step 303).

A scheme of measuring the path loss by user equipment 10 will be explained in detail. A field for denoting transmitting outputs of corresponding base station 10 and indoor base station 21 or 22 are included in the SIB broadcasted by outdoor base station 20 and indoor base station 21 or 22. User equipment 10 may measure the path losses of UL/DL by calculating differences of power between the transmitting outputs denoted in the field and measured signals (for instance preambles). In one embodiment, if the transmitting power of indoor base station 21 or 22 is 20 dB and a base output is −103 dB, the DL path loss at indoor base station 21 or 22 is −83 dB (=−103 dB+20 dB), and the UL path loss is −103 dB. Also, if the transmitting power of outdoor base station 20 is 43 dB and a base output is −120 dB, the DL path loss at outdoor base station 20 is −77 dB (=−120 dB+43 dB), and the UL path loss is −120 dB. User equipment 10 may transmit the values of path losses of indoor base station 21 or 22 and outdoor base station 20 and the ID of indoor base station 21 or 22 to outdoor base station as the information to be reported by user equipment 10.

In the present invention, widely known technology may be adopted to determine the values of the UL/DL path losses of indoor base station 21 or 22 and outdoor base station 20.

In the above process of detecting the ID of indoor base station 21 or 22, user equipment 10 may read SIB 1 received from indoor base station 21 or 22 and check the cell identity (PCI or CGI) of the corresponding indoor base station 21 or 22.

Outdoor base station 20 may recognize whether the UL/DL path losses of corresponding user equipment 10 are 'imbalanced' based on the values of the UL/DL path losses transmitted from user equipment 10 (step 304). Further, outdoor base station 20 may check whether the ID of indoor base station 21 or 22 is included in the list of the CCSG femtocells (step 304). If the UL/DL path losses of corresponding user equipment 10 are 'imbalanced' and indoor base station 21 or 22 is included in the CCSG, outdoor base station 20 may allow user equipment 10 to access indoor base station 21 or 22. For this, outdoor base station 20 may transmit a message, including a command to allow the access of the user equipment 10, to indoor base station 21 or 22 and another massage, informing permission to access, to user equipment 10 (step 306). Thus, user equipment may establish a random access channel (RACH) with respect to indoor base station 21 or 22, receive a response from indoor base station 21 or 22 and perform a request for access.

Thereafter, user equipment 10 may perform a network entry procedure to indoor base station 21 or 22. In one embodiment, the network entry procedure may include the handover, and indoor base station 21 or 22 may be a target base station of the hand over. The network entry procedure largely includes: a process of acquiring transmission parameters; a process of ranging; a negotiation process of basic capabilities; a process of certifying the user equipment and exchanging keys; a process of registration; and a process of connection and so on, and well-known technology may be adopted to perform the network entry.

According to the processes mentioned above, the user equipment can access the CSG base station (strictly speaking, the CCSG base station) accessible only to the specific subscribers can access. By accessing the CCSG base station, the user equipment can reduce power, particularly UL power. The reasons will be explained hereinafter. Since the link quality of the DL is determined by the transmitting power of the base station (if the path loss is great, the transmitting power is increased), the power consumed by the user equipment at receiving is determined with the power received at the DL. However, in the case of UL, the link quality is determined with the transmitting power of the user equipment. Thus, if the path loss is great, the user equipment may consume as much as the path loss difference in order to get the same link quality. In the case shown in FIG. 2, the user equipment may consume large power, as much as 17 dB, in order to get the same link quality. Thus, the user equipment can reduce UL power by accessing the CCSG base station instead of the outdoor base station.

According to the present invention, the access to the CSG femtocell is granted to the user equipment, which had not been permitted to access to the CSG base station, if the user equipment meets the access condition (imbalance of path losses of UL/DL). Thus, the UL power of the user equipment can be reduced, and there is also an advantage of reducing interference to the up-link which is caused by the access to the outdoor base station.

Although embodiments have been described with reference to a number of illustrative embodiments thereof to facilitate an understanding of the present invention, it should be understood that equivalent replacements and changes can be devised by those skilled in the art within the sprit and the scope of the present invention. Also, the technical scope of the present invention should be determined by the appended claims.

What is claimed is:

1. A method of managing cells of base stations, the method comprising:
   a) at an outdoor base station, managing a list of indoor base stations of a conditional closed subscriber group (CCSG) selected from among indoor base stations of a closed subscriber group (CSG), which permit access of specific user equipments, wherein the indoor base stations of the CCSG allow a user equipment, which is not the specific user equipments, to access the indoor base stations when the user equipment meets an access condition;
   b) at the outdoor base station, broadcasting a reporting criteria and reporting information;
   c) at the outdoor base station, receiving measurement values that match the reporting criteria and an identity of an indoor base station as the reporting information from the user equipment; and
   d) at the outdoor base station, recognizing an environment of the user equipment based on the measurement value, determining the identity of the indoor base station in the list of the CCSG, and allowing the user equipment to access to the indoor base station based on a result of determining when the recognized environment meets the access condition.

2. The method of claim 1, wherein the user equipment performs a handover to the indoor base station where access is allowed.

3. The method of claim 2, wherein access is determined using maximum/minimum values of uplink/downlink path losses from the user equipment to the outdoor base station and to the indoor base station.

4. The method of claim 3, wherein the measurement values are uplink/downlink path losses ranging from the minimum path loss to the maximum path loss, and the measurement values include uplink/downlink path losses from the user equipment to the outdoor base station and to the indoor base station.

5. The method of claim 4, wherein the user equipment has imbalanced up-link/down-link path losses.

6. The method of claim 5, further comprising:
   transmitting a message of allowance to the user equipment and to the indoor base station when the up-link/down-link path losses of the user equipment are imbalanced and the identity of the indoor base station is included in the CCSG,
   wherein at the outdoor base station, recognizing whether the up-link/down-link path losses of the user equipment are imbalanced based on the values of the up-link/down-link path losses transmitted from the user equipment;
   determining whether the identity of the indoor base station is included in the list of the CCSG; and
   when the up-link/down-link path losses of the user equipment are imbalanced and the identity of the indoor base station is included in the CCSG, transmitting a message of allowance to the user equipment and to the indoor base station.

7. The method of claim 1, wherein access is determined using maximum/minimum values of uplink/downlink path losses from the user equipment to the outdoor base station and to the indoor base station.

8. The method of claim 7, wherein the measurement values are uplink/downlink path losses ranging from the minimum path loss to the maximum path loss, and the measurement values include uplink/downlink path losses from the user equipment to the outdoor base station and to the indoor base station.

9. The method of claim 8, wherein the user equipment has imbalanced up-link/down-link path losses.

10. The method of claim 9, wherein the d) includes:
at the outdoor base station, recognizing whether the up-link/down-link path losses of the user equipment are imbalanced based on the values of the up-link/down-link path losses transmitted from the user equipment;
determining whether the identity of the indoor base station is included in the list of the CCSG; and
transmitting a message of allowance to the user equipment and to the indoor base station when the up-link/down-link path losses of the user equipment are imbalanced and the identity of the indoor base station is included in the CCSG.

11. A mobile communication system, comprising:
an outdoor base station comprising a table for saving and managing a list of indoor base stations of a conditional closed subscriber group (CCSG) selected from among indoor base stations of a closed subscriber group (CSG), which permit access of specific user equipments, wherein the indoor base stations of the CCSG allow a user equipment, which is not the specific user equipments, to access the indoor base stations when the user equipment meets an access condition,
to broadcast a reporting criteria and reporting information,
to receive measurement values meeting the reporting criteria and an identity of the indoor base station as the reporting information from the user equipment,
to recognize an environment of the user equipment based on the measurement values,
to determine the identity of the indoor base station in the list of the CCSG, and
to allow the user equipment to access the indoor base station based on a result of determining when the recognized environment meets the access condition,
wherein the CCSG base stations including indoor base stations having the identity are in a macro-cell region managed by the outdoor base station and become a target base station of an handover performed by the user equipment.

12. The system of claim 11, wherein the user equipment is configured to perform a handover to the indoor base station.

13. The system of claim 12, wherein the access condition is maximum/minimum values of up-link/down-link path losses from the user equipment to the outdoor base station and to the indoor base station, and the measurement values are the up-link/down-link path losses ranging from a minimum value path loss to a maximum path value, and the measurement values include up-link/down-link path losses from the user equipment to the outdoor base station and to the indoor base station.

14. The system of claim 13, wherein the user equipment has imbalanced up-link/down-link path losses.

15. The system of claim 14, wherein the outdoor base station recognizes whether the up-link/down-link path losses of the user equipment are imbalanced based on the values of the up-link/down-link path losses transmitted from the user equipment, and determines whether the identity of indoor base station is included in the list of the CCSG, and when the up-link/down-link path losses of the user equipment are imbalanced and the identity of the indoor base station is included in the CCSG, the outdoor base station transmits a message to allow the user equipment to access the indoor base station.

16. The system of claim 11, wherein the access condition is maximum/minimum values of up-link/down-link path losses from the user equipment to the outdoor base station and to the indoor base station, and the measurement values are the up-link/down-link path losses ranging from a minimum value path value to a maximum path value, and the measurement values include up-link/down-link path losses from the user equipment to the outdoor base station and to the indoor base station.

17. The system of claim 16, wherein the user equipment has imbalanced up-link/down-link path losses.

18. The system of claim 17, wherein the outdoor base station recognizes whether the up-link/down-link path losses of the user equipment are imbalanced based on the values of the up-link/down-link path losses transmitted from the user equipment, and determines whether the identity of indoor base station is included in the list of the CCSG, and when the up-link/down-link path losses of the user equipment are imbalanced and the identity of the indoor base station is included in the CCSG, the outdoor base station transmits a message to allow the user equipment to access the indoor base station.

* * * * *